United States Patent
Hildesheim et al.

(10) Patent No.: US 10,114,768 B2
(45) Date of Patent: Oct. 30, 2018

(54) ENHANCE MEMORY ACCESS PERMISSION BASED ON PER-PAGE CURRENT PRIVILEGE LEVEL

(71) Applicant: Intel Corporation, Santa Clara, CA (US)

(72) Inventors: Gur Hildesheim, Haifa (IL); Gilbert Neiger, Hillsboro, OR (US); Baiju V. Patel, Portland, OR (US); Ron Rais, Hadera (IL)

(73) Assignee: Intel Corporation, Santa Clara, CA (US)

( * ) Notice: Subject to any disclaimer, the term of this patent is extended or adjusted under 35 U.S.C. 154(b) by 142 days.

(21) Appl. No.: 15/249,521

(22) Filed: Aug. 29, 2016

(65) Prior Publication Data
US 2018/0060250 A1    Mar. 1, 2018

(51) Int. Cl.
*G06F 12/14* (2006.01)
*G06F 12/1009* (2016.01)
*G06F 12/1027* (2016.01)

(52) U.S. Cl.
CPC ...... *G06F 12/1491* (2013.01); *G06F 12/1009* (2013.01); *G06F 12/1027* (2013.01); *G06F 12/1483* (2013.01); *G06F 2212/1052* (2013.01); *G06F 2212/657* (2013.01); *G06F 2212/68* (2013.01)

(58) Field of Classification Search
CPC .... G06F 12/1416–12/1491; G06F 2212/2141; G06F 9/468
See application file for complete search history.

(56) References Cited

U.S. PATENT DOCUMENTS

| | | | | |
|---|---|---|---|---|
| 4,677,546 A | * | 6/1987 | Freeman | G06F 12/1491 711/201 |
| 5,317,717 A | * | 5/1994 | Cutler | G06F 12/1475 711/163 |
| 6,854,039 B1 | | 2/2005 | Strongin et al. | |
| 7,111,146 B1 | * | 9/2006 | Anvin | G06F 12/1036 711/144 |
| 9,747,052 B2 | * | 8/2017 | Grisenthwaite | G06F 3/0664 |

(Continued)

FOREIGN PATENT DOCUMENTS

KR    1020150119038    10/2015

OTHER PUBLICATIONS

<https://math.stackexchange.com/questions/945003/demonstrating-seconds-morgans-law-using-the-first-one-and-double-negation>. Published Sep 2014. (Year: 2014).*

(Continued)

*Primary Examiner* — Charles Rones
*Assistant Examiner* — Hewy H Li
(74) *Attorney, Agent, or Firm* — Lowenstein Sandler LLP

(57) ABSTRACT

A processing system includes a processing core and a memory management unit, communicatively coupled to the processing core, comprising a storage device to store a page table entry (PTE) comprising a mapping from a virtual memory page referenced by an application running on the processing core to an identifier of a memory frame of a memory, a first plurality of access permission flags associated with accessing the memory frame under a first privilege mode, and a second plurality of access permission flags associated with accessing the memory under a second privilege mode.

20 Claims, 12 Drawing Sheets

(56) References Cited

U.S. PATENT DOCUMENTS

| | | | |
|---|---|---|---|
| 2002/0194389 A1* | 12/2002 | Worley, Jr. | G06F 9/4812 719/310 |
| 2008/0222397 A1* | 9/2008 | Wilkerson | G06F 12/145 712/220 |
| 2011/0202739 A1* | 8/2011 | Grisenthwaite | G06F 12/1491 711/163 |
| 2012/0151117 A1* | 6/2012 | Tuch | G06F 12/1491 711/6 |
| 2012/0191899 A1* | 7/2012 | Zbiciak | G06F 13/366 711/103 |
| 2013/0103984 A1* | 4/2013 | Nakaide | G06F 11/273 714/27 |
| 2014/0331023 A1* | 11/2014 | Sharp | G06F 12/1009 711/206 |
| 2016/0092371 A1* | 3/2016 | Shanbhogue | G06F 12/1009 711/207 |
| 2016/0092678 A1* | 3/2016 | Probert | G06F 9/45558 713/193 |
| 2016/0110298 A1 | 4/2016 | Koufaty et al. | |
| 2016/0188492 A1 | 6/2016 | Bachwani et al. | |
| 2017/0255569 A1* | 9/2017 | Sartorius | G06F 12/0891 |

OTHER PUBLICATIONS

Riley, Ryan, Xuxian Jiang, and Dongyan Xu. "An architectural approach to preventing code injection attacks." IEEE Transactions on Dependable and Secure Computing 7.4 (2010): 351-365. (Year: 2010).*

PCT, International Search Report and Written Opinion for International Application No. PCT/US2017/043388, dated Oct. 26, 2017, 15 pages.

* cited by examiner

ENHANCE MEMORY ACCESS PERMISSION BASED ON PER-PAGE CURRENT PRIVILEGE LEVEL

TECHNICAL FIELD

The present disclosure relates to memory management and, more specifically, to enhance memory access permissions to be associated with the current privilege level (CPL).

BACKGROUND

A computing device may include one or more processing cores in one or more processors (such as central processing units (CPUs)) for executing instructions and a memory device (such as random-access memory (RAM)) for storing instructions and data associated with executing tasks (including user application and system application such as the kernel of an operating system) on the one or more processing cores. Instructions of each application program may access the memory using virtual addresses (or linear addresses) in a virtual memory address space. A memory management unit may use a page table to translate virtual addresses into physical addresses of the memory.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
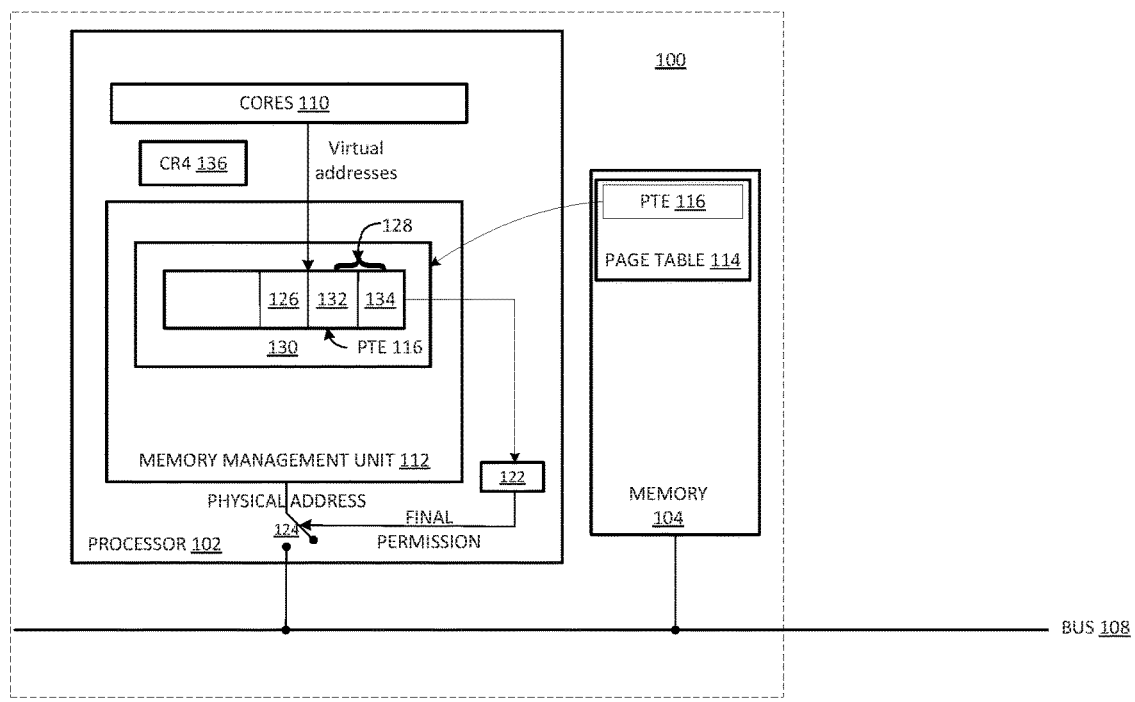
FIG. 1 illustrates a system-on-a-chip (SoC) including a processing system to protect the memory according an embodiment of the present disclosure.

A computing device may include one or more processing cores in one or more processors (such as central processing units (CPUs)) for executing instructions and a memory device (such as random-access memory (RAM)) for storing instructions and data associated with executing tasks (including user application and system application such as the kernel of an operating system) on the one or more processing cores. Instructions of each application program address the memory using virtual addresses (or linear addresses) of a virtual memory which may be translated into physical addresses of the memory by a memory management unit (MMU) associated with the one or more processors. The virtual memory may be organized according to virtual memory pages that may be mapped, by the MMU, to page frames of the memory. Each virtual memory page may correspond to a memory frame of the memory. The virtual memory pages may be identified according to page numbers while the page frames of the memory may be identified according to memory frame numbers. Each virtual address may include a page number and an offset within the page at the page number. Therefore, a specific physical address of the memory may be determined by looking up a page table for a page number and the offset. Each page table entry (PTE) specifies the virtual address to physical address translation as well as other attributes of the memory page, such as access permissions. In this way, the space of virtual addresses accessible by tasks executed on the processing cores may be larger than the physical memory addresses.

An application program may be associated with a privilege level that determines its access mode (e.g., as a user or as a supervisor) to memory. For example, a user application may have a low privilege of a user-mode, and a system application (such as the kernel) may have a high privilege of a supervisor-mode. A memory management unit in the processor may translate virtual addresses to physical addresses for accessing the memory.

A page table entry is an item in a page table that is used to mapping virtual addresses to physical addresses of the memory. The page table may be stored in a specified location in the memory. The page table entry may also include fields to store attribute values of a page referenced by the page table entry. For example, in some implementations, the page table entry may include a field to store memory frame numbers that are identified according to virtual address page numbers, thus providing a mapping between virtual memory addresses employed by software applications to physical memory addresses that identify locations in the memory device. The page table entry may also include fields that store attribute values associated with the memory page frame. For example, the page table entry may include a field to store a page validity flag such as the present/absent (P/A) bit. If the P/A bit is "1," the page frame associated with the page frame number of the page table entry is valid and can be used. But if the P/A bit is "0," the page frame is invalid (or not currently in memory).

The page table entry may also include another field to store one or more access permission bits. Each one of the access permission bits may correspond to one type of access permission. For example, a first bit may define the "read (R)" permission (e.g., "1" indicates readable, and "0" indicates not readable), a second bit may define the "write (W)" permission (e.g., "1" indicates writeable, and "0" indicates not writeable), and a third bit may define the "execute disable (XD)" permission (e.g., "1" indicates that execution is disabled, and "0" indicates executable).

Current implementations of access permission bits associated with the page table entry do not specify whether the access permissions are associated with the user mode or the supervisor mode. These access permissions, in particular the W and XD bits, are commonly shared by both the user mode and the supervisor mode. Therefore, the memory frame specified by the page table entry is either writeable for both user and supervisor level applications, or by none of them. Similarly, it is also either executable for both user and supervisor level applications or none of them. The bundle of the access permissions for both the user mode and the supervisor mode, however, is not efficient because the software applications may run at a restriction higher than it requires.

Current solutions may include the employment of global configurations bits stored in control registers to define the access permissions for all memory pages either under the user mode or under the supervisor mode. For example, a configurations bit (WP) stored in a control register (CR0) may globally specify that all memory frames are writeable under the supervisor mode regardless of the write access permission bit stored in the page table entry. This type of solutions, however, does not allow the specification of page-level access permissions or different combination of permissions.

Embodiments of the present disclosure provide a new set of access permission bits stored in page table entries that may specify the access permissions with respect to an additional attribute (e.g., the privilege level of the user mode or the supervisor mode) of pages of the virtual address space. Thus, the operating system may decouple the user and supervisor specific access permissions. In one embodiment, the privilege-level specific access permissions can be selectively enabled by a configuration bit stored in a control register associated with a processor. For example, if the configuration bit is set to "1," the W and XD bits may be used under the supervisor mode, and new W' and XD' bits may be added to the page table entries and used under the user mode. If the configuration bit is set to "0," the legacy W and XD bits are used for both supervisor and user modes. In this way, embodiments of the present disclosure allow the operating system to set precise and targeted access permissions for user-level software applications and supervisor-level software applications at a granularity of memory pages.

FIG. 1 illustrates a system-on-a-chip (SoC) 100 including a processing system to protect the memory according an embodiment of the present disclosure. The SoC 100 may include a processor (such as a central processing unit (CPU)) 102 and a memory 104 that are connected to each other via a bus system 108. Memory 104 may store system application and user application programs and the data associated with the programs. The processor 102 may execute tasks such as system applications and user applications using the memory 104 to store the instructions of the programs and data associated with the programs.

The processor 102 may further include one or more processing cores 110 and a memory management unit (MMU) 112. The one or more processing cores are logic circuits within the processor 102 for executing the tasks. In one embodiment, the tasks executed on processing cores 110 do not access the memory 104 directly using the physical addresses of the memory. Instead, the tasks access a virtual memory through virtual addresses (also known as linear addresses). The memory management unit 112, coupled between the processing cores 110 and the memory, may map the virtual addresses of the virtual memory to the physical addresses of the memory 104. The space of virtual addresses may be divided into fixed sized units called pages. A page of the virtual addresses may be mapped correspondingly into fixed-sized units in the space of the physical addresses of the memory 104 called memory frames.

In one embodiment, the memory 104 may store a page table 114 for storing the mappings between pages of virtual addresses to physical addresses. The mappings may include correspondences between identifiers of pages (or page numbers) to identifiers of memory frames (or memory frame numbers). The memory frame numbers determine the region of the memory 104 allocated to a task.

The page table 114 may include one or more page table entries (PTEs) 116. In one embodiment, page table entry 116 of the page table 114 may be loaded into a page table register 130 of the memory management unit 112 so that the memory management unit 112 may perform the memory address mapping. Each one of the page table entries may store one or more memory frame numbers that are identified according to virtual page numbers. In one embodiment, a task executing on the processing cores 110 may allocate a block of memory by specifying one or more virtual address ranges. A virtual address may include a first portion including one or more bits (e.g., the high-order twenty bits) indicating the virtual page number and a second portion of bits (e.g., the lower-order 12 bits) indicating the byte offset within a memory frame corresponding to the page. The memory management unit 112 may use the virtual page number to identify a memory frame number stored in the page table entry 116, and combine the identified memory frame number and the offset byte to form a physical address for accessing the memory 104.

In one embodiment, the memory management unit 112 may include logic circuits to check the memory access permission for the task to prevent certain types of memory accesses (e.g., those caused by stray accesses). In one embodiment, each page table entry 116 may include one or more status bits to indicate certain page access statuses that need to be checked before mapping the page numbers in page table entry to memory frame numbers. In one embodiment, one of the status bits in each page table entry 116 is a memory access mode status bit U/S 126 to indicate if the page belongs to the user type or the supervisor type.

In one embodiment, the page table entry 116 may further include access permission flag section 128 to store at least one access permission flag 130 associated with user-level software applications and at least one access permission flag 132 associated with supervisor-level software applications. In one embodiment, each one of the access permission flags stored in section 128 may be represented by one bit. Thus, section 128 may include at least one access permission bit associated with the user mode and at least one access permission bit associated with the supervisor mode.

In one embodiment, the access permission bits associated with the user mode represent the execution-disable (XD') permission (or alternatively, the execution (X') permission) and write (W') permission. Further, the access permission bits associated with the user mode may optionally include a third bit representing the read (R') permission. When these bits are set to "1," they respectively represent that the memory region defined in the page able entry is writeable, execute disabled, or readable by the application of user privilege; when these bits are set to "0," they respectively represent that the memory region defined in the page able entry is not writeable, not execute disabled, or not readable by the application of user privilege.

Similarly, the access permission bits associated with the supervisor represent the execution-disable (XD) permission (or alternatively, the execution (X) permission) and the write (W) permission. Further, the access permission bits associated with the supervisor mode may optionally include a third bit representing the read (R) permission. When these bits are set to "1," they respectively represent that the memory region defined in the page able entry is writeable, execute disabled, or readable by the application of supervisor privilege; when these bits are set to "0," they respectively represent that the memory region defined in the page able entry is not writeable, not execute disabled, or not readable by the application of supervisor privilege.

Thus, embodiments of the present disclosure allows for the operating system to set access permissions for the user mode and the supervisor mode for a memory frame (i.e., at the page granularity). A memory frame may be associated with different access permissions for the supervisor mode and the user mode.

In one embodiment, the expansion of the memory access permissions to reflect the user mode and the supervisor mode may be selectively enabled or disabled by employing a configuration flag stored in a control register (e.g., CR4) 136. As shown in FIG. 1, processor 102 may include control register 136 to store the configuration flag. In one embodiment, the configuration flag may be a bit of control register 136 that, when set to "1," indicates the enablement of the separate access permission flags (e.g., 132, 134) for the supervisor mode and the user mode. When the one-bit configuration flag is set to "0," however, the access permissions are not separated between the supervisor mode and the user mode. They may share one set of access permission flags (e.g., 134).

In one embodiment, memory management unit 112 may include registers (not shown) to store a hierarchy of system data structures for memory management. For example, the system data structures may include sets of page directories that may include entries (PDEs) containing the physical address of the base of the page table 114, access permissions associated with the PDEs, and memory management information. The system data structures may also include a set of page directory pointer tables (PDPTs) that may include entries (PDPTEs) containing the physical addresses of the base of a page directory table, access permissions associated with the PDPTEs, and memory management information. The system data structures may include a page map (level-4 (PML4) or level-5 (PML5)) data structure that includes entries containing the base of the PDPT, access permissions associated with the page map data structure entries, and memory management information. The base physical address of the page map data structure may be stored in a control register (e.g., CR3).

In one embodiment, when the configuration flag 136 is enabled, the access permissions stored in PDEs, PDPTEs, and entries of the page map may also include at least one access permission flag associated with the user mode and at least one access permission flag associated with the supervisor mode. The access permission flags associated with PDEs, PDPTEs, and entries of the page map may be the same as access permission flags 132, 134 associated with page table 114, and alternatively, the access permission flags associated with PDEs, PDPTEs, and entries of the page map may be different from access permission flags 132, 134 associated with page table 114.

The process to translate virtual addresses employed by software applications to physical addresses associated with memory is referred to as page translation (or page walk).

During the page translation process, memory management unit 112 may identify all virtual memory pages stored in PTEs requested by a software application and translate these pages into memory frames. During the translation, the memory management unit 112 may accumulate access permissions through logic operations using a logic operator circuit 122 to arrive at a final access permission. The final access permission determines the access permission for the collection of memory frames.

The logic operator circuit 122 may include circuits to perform different types of logic operations including the AND operation and the OR operation. In one embodiment, the user-level write permissions (W') stored in a set of page table entries are accumulated by applying the AND operator successively to each one of the user-level write permissions to generate an accumulated user write permission associated with the set of page table entries. Similarly, supervisor-level write permission (W) stored in a set of page table entries are accumulated by applying the AND operator successively to each one of the supervisor-level write permissions to generate an accumulated supervisor write permission associated with the set of page table entries.

In one embodiment, the user-level execute-disable (XD') stored in a set of page table entries are accumulated by applying the OR operator successively to each one of the user-level execute-disable permissions to generate an accumulated user execute-disable permission associated with the set of page table entries. Similarly, the supervisor-level execute-disable (XD) stored in a set of page table entries are accumulated by applying the OR operator successively to each one of the supervisor-level execute-disable permissions to generate an accumulated supervisor execute-disable permission associated with the set of page table entries.

The logic operator circuit 122 may generate the memory access permission based on the access permission flags stored in the page table entry 116 to generate a final, accumulated memory access permission for accessing the memory frames referenced in the page table entry 116.

In one embodiment, in response to a request by a task executing on the cores 110 to access memory frames whose identifiers are stored in the page table entry 116, the memory management unit 112 may generate the accumulated memory access permission through the page translation process as discussed above. Memory management unit 112 may determine whether the request from the task has exceeded the permission assigned to the task. The final memory access permission may be used to control a switch 124. If the request from the task does not exceed the final memory access permission either under the user mode or under the supervisor mode, the switch 124 may engage and allow the physical address to pass through to the bus 108 for accessing the memory 104. If the request from the task exceeds the final memory access permission, the gate 124 may disengage and prevent the physical address from the bus 108.

Figure 2:
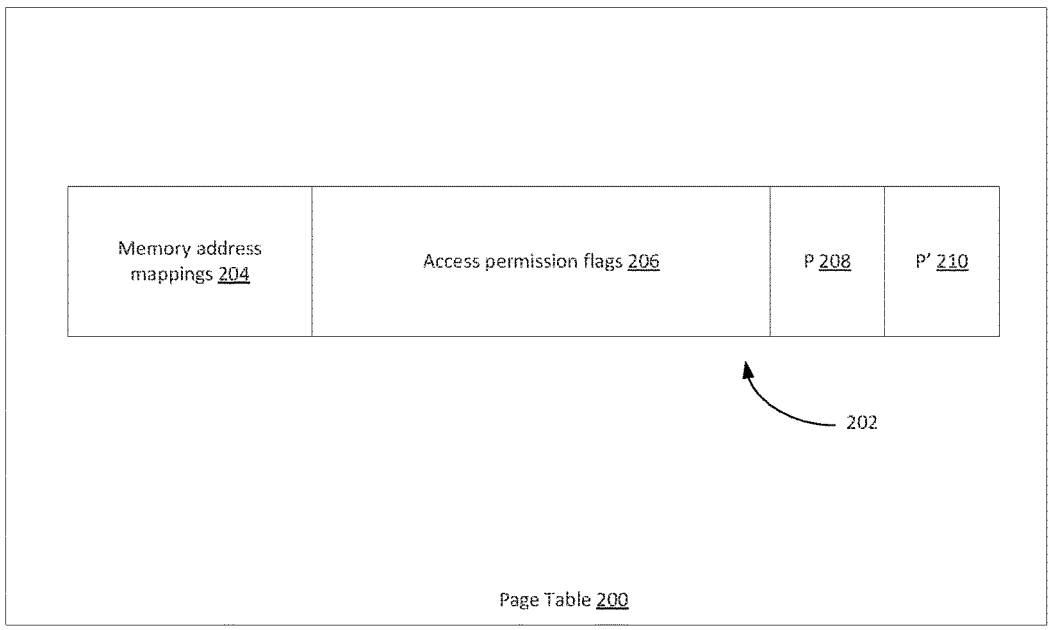
FIG. 2 illustrates a page table according to an embodiment of the present disclosure.

In addition to the access permission flags, embodiments of the present disclosure may also separately provide other status flags such as, for example, the present/absent bit, for the user mode and the supervisor mode. FIG. 2 illustrates a page table 200 according to an embodiment of the present disclosure. As shown in FIG. 2, page table 200 may include a page table entry 202 which includes fields to store information relating to memory address mapping. Page table entry 202 may include a first field 204 to store virtual address to physical memory address mapping (i.e., correspondences between virtual page identifier to memory frame identifier), a second field 206 to store access permission flags. The access permission flags may include write (W) bit and/or execute-disable (XD) bit associated with the supervisor mode, and/or write (W') bit and/or execute-disable (XD') bit associated with the user mode. The access permission flags may also optionally include read bit (R) associated with the supervisor mode and/or read (R') bit associated with the user mode. Page table entry 202 may further include a first present/absent bit (P) associated with the supervisor mode and a second present/absent bit (P') associated with the user mode, thus achieving the decoupling of the present/absent bit between the supervisor-level privilege and the user-level privilege. In one embodiment, the P/A bit may be decoupled for each stage (e.g., in PDEs, PDPTEs, PML4 entries) of the virtual address translation.

Figure 3:
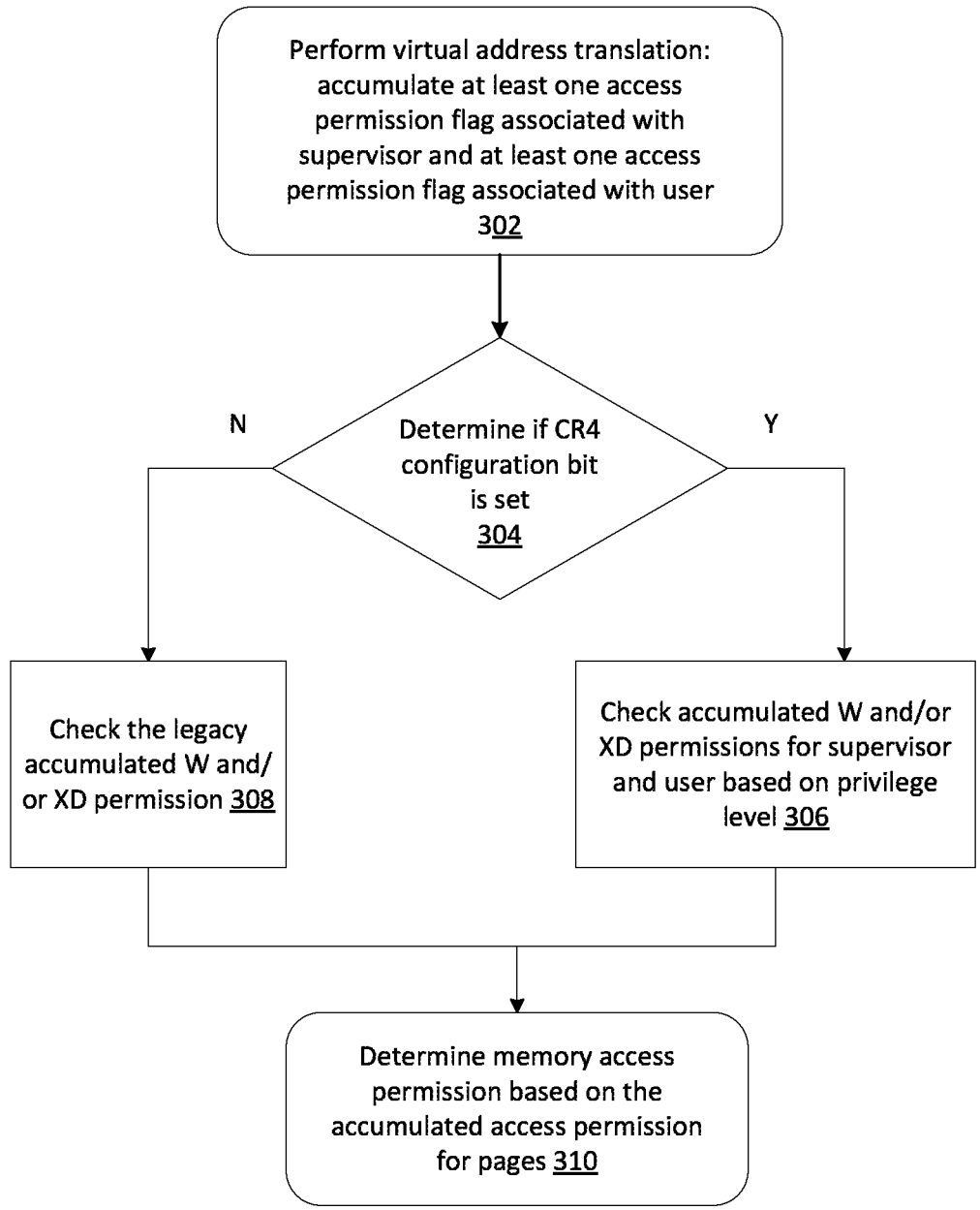
FIG. 3 is a block diagram of a method to determine memory access permission according to an embodiment of the present disclosure.

FIG. 3 is a block diagram of a method 300 to determine memory access permission according to an embodiment of the present disclosure. Method 300 may be performed by processing logic that may include hardware (e.g., circuitry, dedicated logic, programmable logic, microcode, etc.), software (such as instructions run on a processing device, a general purpose computer system, or a dedicated machine), firmware, or a combination thereof. In one embodiment, method 300 may be performed, in part, by memory management unit 112 as shown in FIG. 1.

For simplicity of explanation, the method 300 is depicted and described as a series of acts. However, acts in accordance with this disclosure can occur in various orders and/or concurrently and with other acts not presented and described herein. Furthermore, not all illustrated acts may be performed to implement the method 300 in accordance with the disclosed subject matter. In addition, those skilled in the art will understand and appreciate that the method 300 could alternatively be represented as a series of interrelated states via a state diagram or events.

In one embodiment, all of the status flags (including the access permission flags (W, XD, R) and present/absent status) are decoupled according to the supervisor mode and the user mode. In another embodiment, only a subset of the status flags is decoupled according to the supervisor mode and the user mode. For example, the subset of status flags may include any combinations of W, XD, R, P, and any other status flags associated with memory frames.

Referring to FIG. 3, at 302, responsive to a request by a software application to access a memory segment specified according to virtual addresses, the memory management unit may perform virtual address translation. The memory segment may include multiple virtual pages that can be mapped to physical memory frames according to page table entries. In addition to the memory address mapping, each page table entry may store a first set of access permission flags (e.g., W, XD) associated with the supervisor mode and a second set of access permission flags (e.g., W', XD') associated with the user mode. The memory management unit may perform the access permission accumulation (using AND operator and OR operator) for each access permissions for the supervisor mode and the user mode, respectively.

At 304, the memory management unit may determine whether a configuration flag stored in a control register (CR4) is set (e.g., set to the value of "1"). If the configuration flag is set, the access permission flags are stored in the page table entries separately in a first set for the supervisor mode and a second set for the user mode. At 306, the memory management unit may check both the first set of access permission flags associated with the supervisor and the second set of access permission flags associated with the user. The final supervisor access permission for the supervisor mode may be accumulated through the first set of access permission flags, and the final user access permission for the user mode may be accumulated through the second set of access permission flags.

If the configuration flag is not set (e.g., configuration flag="0"), the separation of access permissions for the supervisor mode and the user mode are not enabled. At 308, the memory management unit does not distinguish the access permission flags between the supervisor mode and the user mode. The access permission flags are associated with both the supervisor and the user. The accumulated access permission is also used for both.

At 310, the memory management unit may determine whether the memory access requested should be granted based on the accumulated access permission. When the control register (CR4) is set to "1," the memory management unit may determine the request from supervisor-level applications based on the accumulated access permission flags associated with the supervisor mode, and the request from user-level applications based on the accumulated access permission flags associated with the user mode.

Figure 4:
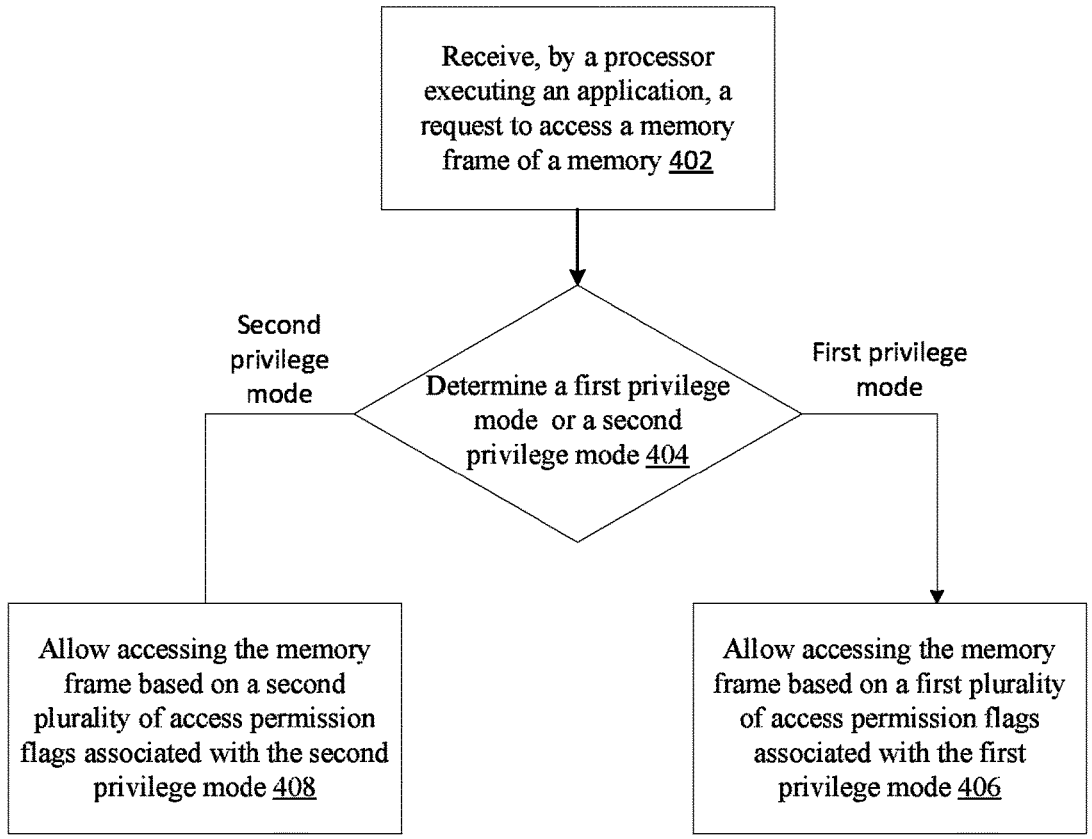
FIG. 4 is a block diagram of a method 400 to determine the access permission for accessing a memory frame according to another embodiment of the present disclosure.

FIG. 4 is a block diagram of a method 400 to determine the access permission for accessing a memory frame according to another embodiment of the present disclosure. Method 400 may be performed by processing logic that may include hardware (e.g., circuitry, dedicated logic, programmable logic, microcode, etc.), software (such as instructions run on a processing device, a general purpose computer system, or a dedicated machine), firmware, or a combination thereof. In one embodiment, method 400 may be performed, in part, by processing logics of processor 102 and SoC 100 as shown in FIG. 1.

For simplicity of explanation, the method 400 is depicted and described as a series of acts. However, acts in accordance with this disclosure can occur in various orders and/or concurrently and with other acts not presented and described herein. Furthermore, not all illustrated acts may be performed to implement the method 400 in accordance with the disclosed subject matter. In addition, those skilled in the art will understand and appreciate that the method 400 could alternatively be represented as a series of interrelated states via a state diagram or events.

Referring to FIG. 4, processor 102 may receive, from an application running on the processor, a request to access a memory frame of a memory.

At 402, processor 102 may receive, by an application executing on the processor, a request to access a memory frame of a memory.

At 404, the processor may determine whether the application generating the request is associated with a first privilege mode or a second privilege mode. In one embodiment, the first privilege mode can be a supervisor mode, and the second privilege mode can be a user mode.

At 406, the processor may responsive to determining that the application is associated with the first privilege mode, allow accessing the memory frame based on a first plurality of access permission flags associated with the first privilege mode.

At 408, the processor may responsive to determining that the application is associated with the second privilege mode, allow accessing the memory frame based on a second plurality of access permission flags associated with the second privilege mode, wherein the first plurality of access permission flags and the second plurality of access permission flags are stored in a page table entry in the memory.

Figure 5A:
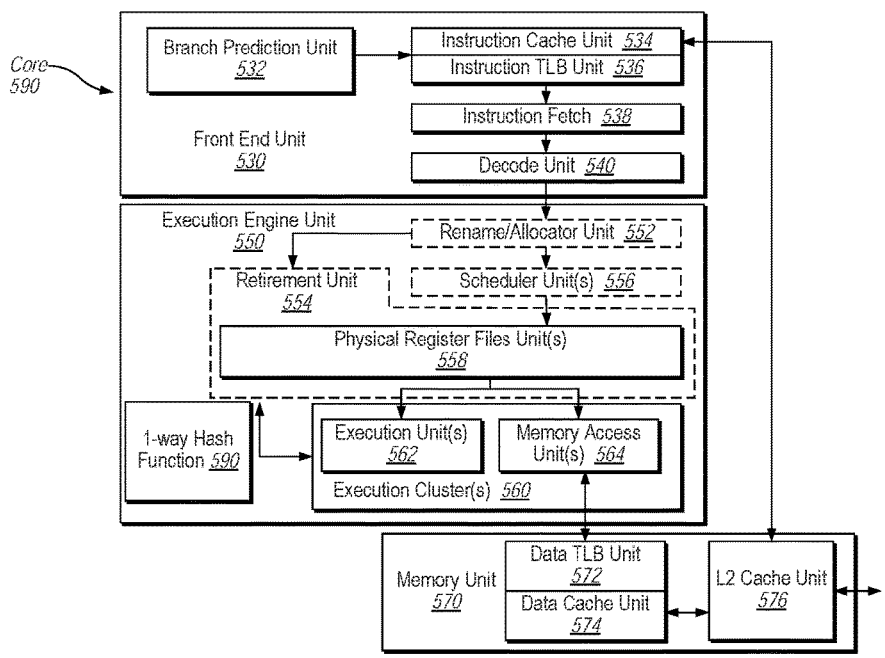
FIG. 5A is a block diagram illustrating a micro-architecture for a processor including heterogeneous core in which one embodiment of the disclosure may be used.

FIG. 5A is a block diagram illustrating a micro-architecture for a processor 500 that implements the processing device including heterogeneous cores in accordance with one embodiment of the disclosure. Specifically, processor 500 depicts an in-order architecture core and a register renaming logic, out-of-order issue/execution logic to be included in a processor according to at least one embodiment of the disclosure.

Processor 500 includes a front end unit 530 coupled to an execution engine unit 550, and both are coupled to a memory unit 570. The processor 500 may include a reduced instruction set computing (RISC) core, a complex instruction set computing (CISC) core, a very long instruction word (VLIW) core, or a hybrid or alternative core type. As yet another option, processor 500 may include a special-purpose core, such as, for example, a network or communication core, compression engine, graphics core, or the like. In one embodiment, processor 500 may be a multi-core processor or may part of a multi-processor system.

The front end unit 530 includes a branch prediction unit 532 coupled to an instruction cache unit 534, which is coupled to an instruction translation lookaside buffer (TLB) 536, which is coupled to an instruction fetch unit 538, which is coupled to a decode unit 540. The decode unit 540 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 540 may be implemented using various different mechanisms. Examples of suitable mechanisms include, but are not limited to, look-up tables, hardware implementations, programmable logic arrays (PLAs), microcode read only memories (ROMs), etc. The instruction cache unit 534 is further coupled to the memory unit 570. The decode unit 540 is coupled to a rename/allocator unit 552 in the execution engine unit 550.

The execution engine unit 550 includes the rename/allocator unit 552 coupled to a retirement unit 554 and a set of one or more scheduler unit(s) 556. The scheduler unit(s) 556 represents any number of different schedulers, including reservations stations (RS), central instruction window, etc. The scheduler unit(s) 556 is coupled to the physical register file(s) unit(s) 558. Each of the physical register file(s) units 558 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 558 is overlapped by the retirement unit 554 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

In one implementation, processor 500 may be the same as processor 102 described with respect to FIG. 1.

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 554 and the physical register file(s) unit(s) 558 are coupled to the execution cluster(s) 560. The execution cluster(s) 560 includes a set of one or more execution units 562 and a set of one or more memory access units 564. The execution units 562 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 556, physical register file(s) unit(s) 558, and execution cluster(s) 560 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 564). It should also be understood that where separate pipelines are used, one or more of these pipelines may be out-of-order issue/execution and the rest in-order.

The set of memory access units 564 is coupled to the memory unit 570, which may include a data prefetcher 580, a data TLB unit 572, a data cache unit (DCU) 574, and a level 2 (L2) cache unit 576, to name a few examples. In some embodiments DCU 574 is also known as a first level data cache (L1 cache). The DCU 574 may handle multiple outstanding cache misses and continue to service incoming stores and loads. It also supports maintaining cache coherency. The data TLB unit 572 is a cache used to improve virtual address translation speed by mapping virtual and physical address spaces. In one exemplary embodiment, the memory access units 564 may include a load unit, a store address unit, and a store data unit, each of which is coupled to the data TLB unit 572 in the memory unit 570. The L2 cache unit 576 may be coupled to one or more other levels of cache and eventually to a main memory.

In one embodiment, the data prefetcher 580 speculatively loads/prefetches data to the DCU 574 by automatically predicting which data a program is about to consume. Prefeteching may refer to transferring data stored in one memory location of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 500 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 5B:
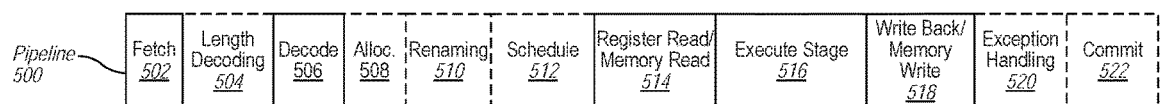
FIG. 5B is a block diagram illustrating an in-order pipeline and a register renaming stage, out-of-order issue/execution pipeline implemented according to at least one embodiment of the disclosure.

FIG. 5B is a block diagram illustrating an in-order pipeline and a register renaming stage, out-of-order issue/execution pipeline implemented by processing device 500 of FIG. 5A according to some embodiments of the disclosure. The solid lined boxes in FIG. 5B illustrate an in-order pipeline, while the dashed lined boxes illustrates a register renaming, out-of-order issue/execution pipeline. In FIG. 5B, a processor pipeline 500 includes a fetch stage 502, a length decode stage 504, a decode stage 506, an allocation stage 508, a renaming stage 510, a scheduling (also known as a dispatch or issue) stage 512, a register read/memory read stage 514, an execute stage 516, a write back/memory write stage 518, an exception handling stage 522, and a commit stage 524. In some embodiments, the ordering of stages 502-524 may be different than illustrated and are not limited to the specific ordering shown in FIG. 5B.

Figure 6:
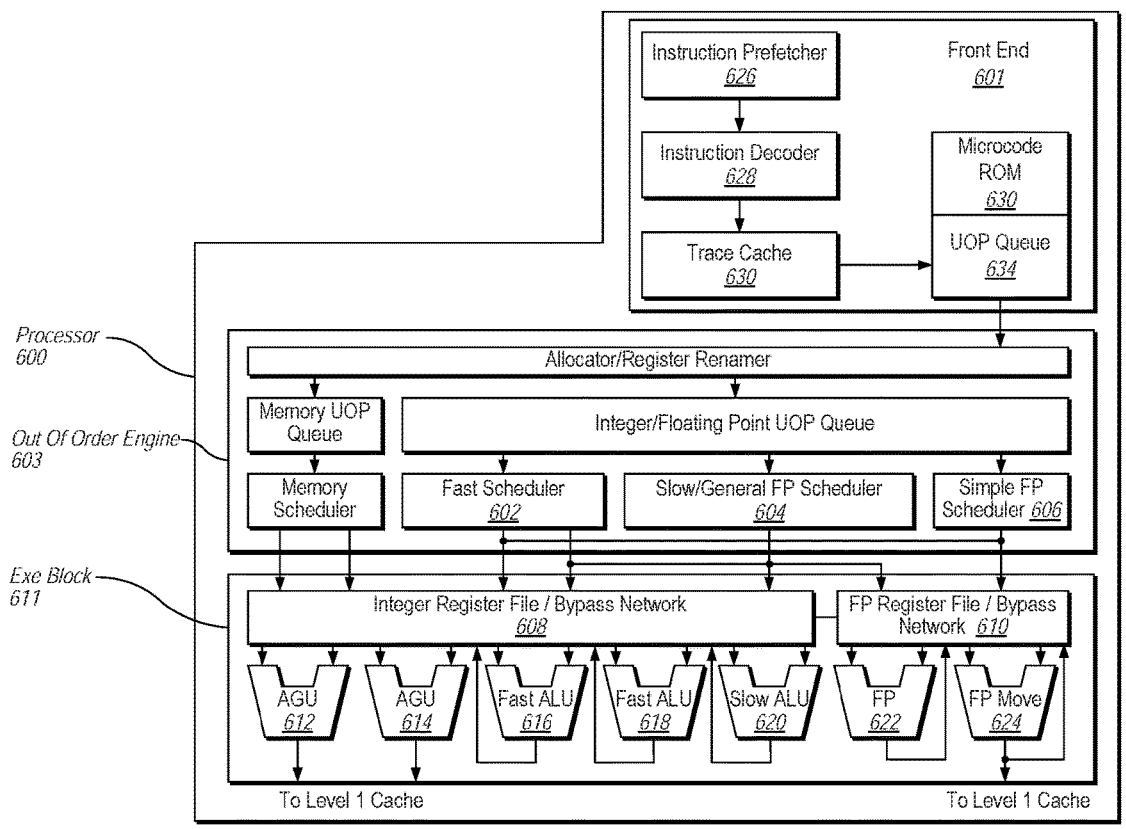
FIG. 6 illustrates a block diagram of the micro-architecture for a processor that includes logic in accordance with one embodiment of the disclosure.

FIG. 6 illustrates a block diagram of the micro-architecture for a processor 600 that includes hybrid cores in accordance with one embodiment of the disclosure. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 601 is the part of the processor 600 that fetches instructions to be executed and prepares them to be used later in the processor pipeline.

The front end 601 may include several units. In one embodiment, the instruction prefetcher 626 fetches instructions from memory and feeds them to an instruction decoder 628 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 630 takes decoded uops and assembles them into program ordered sequences or traces in the uop queue 634 for execution. When the trace cache 630 encounters a complex instruction, the microcode ROM 632 provides the uops needed to complete the operation.

Some instructions are converted into a single micro-op, whereas others need several micro-ops to complete the full operation. In one embodiment, if more than four micro-ops are needed to complete an instruction, the decoder 628 accesses the microcode ROM 632 to do the instruction. For one embodiment, an instruction can be decoded into a small number of micro ops for processing at the instruction decoder 628. In another embodiment, an instruction can be stored within the microcode ROM 632 should a number of micro-ops be needed to accomplish the operation. The trace cache 630 refers to an entry point programmable logic array (PLA) to determine a correct micro-instruction pointer for reading the micro-code sequences to complete one or more instructions in accordance with one embodiment from the micro-code ROM 632. After the microcode ROM 632 finishes sequencing micro-ops for an instruction, the front end 601 of the machine resumes fetching micro-ops from the trace cache 630.

The out-of-order execution engine 603 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 602, slow/general floating point scheduler 604, and simple floating point scheduler 606. The uop schedulers 602, 604, 606, determine when a uop is ready to execute based on the readiness of their dependent input register operand sources and the availability of the execution resources the uops need to complete their operation. The fast scheduler 602 of one embodiment can schedule on each half of the main clock cycle while the other schedulers can only schedule once per main processor clock cycle. The schedulers arbitrate for the dispatch ports to schedule uops for execution.

Register files 608, 610, sit between the schedulers 602, 604, 606, and the execution units 612, 614, 616, 618, 620, 622, 624 in the execution block 611. There is a separate register file 608, 610, for integer and floating point operations, respectively. Each register file 608, 610, of one embodiment also includes a bypass network that can bypass or forward just completed results that have not yet been written into the register file to new dependent uops. The integer register file 608 and the floating point register file 610 are also capable of communicating data with the other. For one embodiment, the integer register file 608 is split into two separate register files, one register file for the low order 32 bits of data and a second register file for the high order 32 bits of data. The floating point register file 610 of one embodiment has 128 bit wide entries because floating point instructions typically have operands from 64 to 128 bits in width.

The execution block 611 contains the execution units 612, 614, 616, 618, 620, 622, 624, where the instructions are actually executed. This section includes the register files 608, 610, that store the integer and floating point data operand values that the micro-instructions need to execute. The processor 600 of one embodiment is comprised of a number of execution units: address generation unit (AGU) 612, AGU 614, fast ALU 616, fast ALU 618, slow ALU 620, floating point ALU 622, floating point move unit 624. For one embodiment, the floating point execution blocks 622, 624, execute floating point, MMX, SIMD, and SSE, or other operations. The floating point ALU 622 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 616, 618. The fast ALUs 616, 618, of one embodiment can execute fast operations with an effective latency of half a clock cycle. For one embodiment, most complex integer operations go to the slow ALU 620 as the slow ALU 620 includes integer execution hardware for long latency type of operations, such as a multiplier, shifts, flag logic, and branch processing. Memory load/store operations are executed by the AGUs 612, 614. For one embodiment, the integer ALUs 616, 618, 620, are described in the context of performing integer operations on 64 bit data operands. In alternative embodiments, the ALUs 616, 618, 620, can be implemented to support a variety of data bits including 16, 32, 128, 256, etc. Similarly, the floating point units 622, 624, can be implemented to support a range of operands having bits of various widths. For one embodiment, the floating point units 622, 624, can operate on 128 bits wide packed data operands in conjunction with SIMD and multimedia instructions.

In one embodiment, the uops schedulers 602, 604, 606, dispatch dependent operations before the parent load has finished executing. As uops are speculatively scheduled and executed in processor 600, the processor 600 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 600 also includes logic to implement store address prediction for memory disambiguation according to embodiments of the disclosure. In one embodiment, the execution block 611 of processor 600 may include a store address predictor (not shown) for implementing store address prediction for memory disambiguation.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 7:
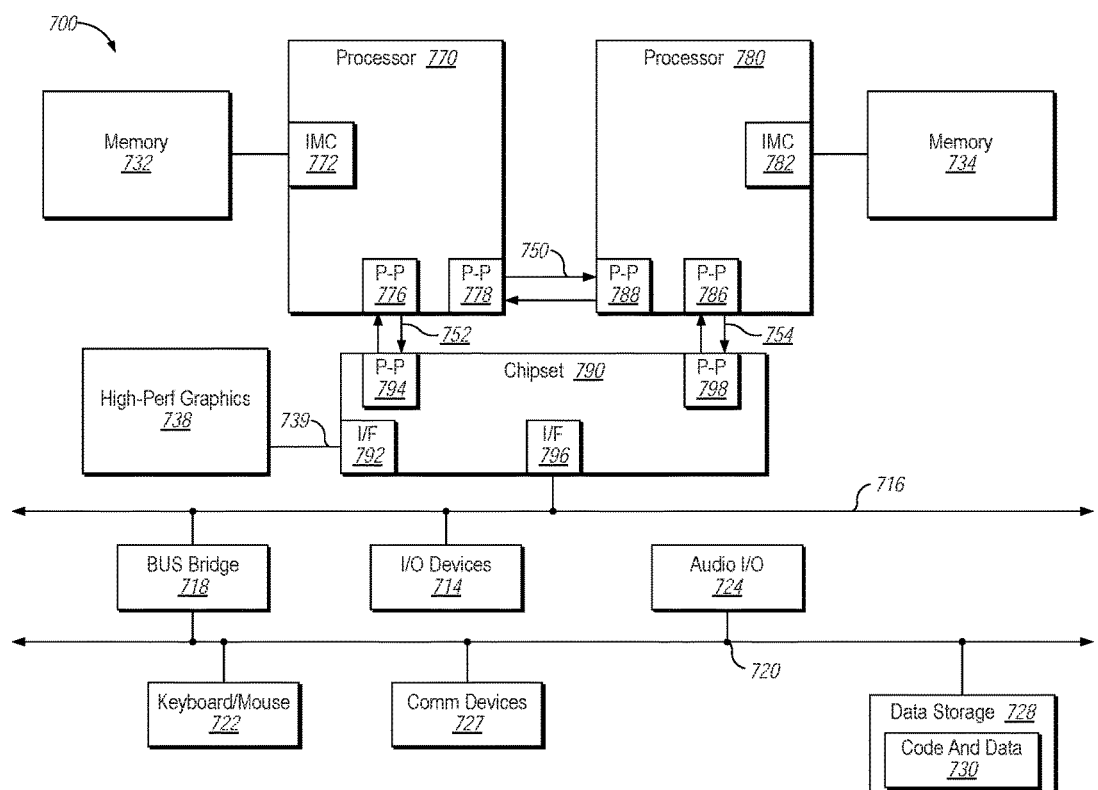
FIG. 7 is a block diagram illustrating a system in which an embodiment of the disclosure may be used.

Referring now to FIG. 7, shown is a block diagram illustrating a system 700 in which an embodiment of the disclosure may be used. As shown in FIG. 7, multiprocessor system 700 is a point-to-point interconnect system, and includes a first processor 770 and a second processor 780 coupled via a point-to-point interconnect 750. While shown with only two processors 770, 780, it is to be understood that the scope of embodiments of the disclosure is not so limited. In other embodiments, one or more additional processors may be present in a given processor. In one embodiment, the multiprocessor system 700 may implement hybrid cores as described herein.

Processors 770 and 780 are shown including integrated memory controller units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present disclosure is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures are possible. For example, instead of the point-to-point architecture of FIG. 7, a system may implement a multi-drop bus or other such architecture.

Figure 8:
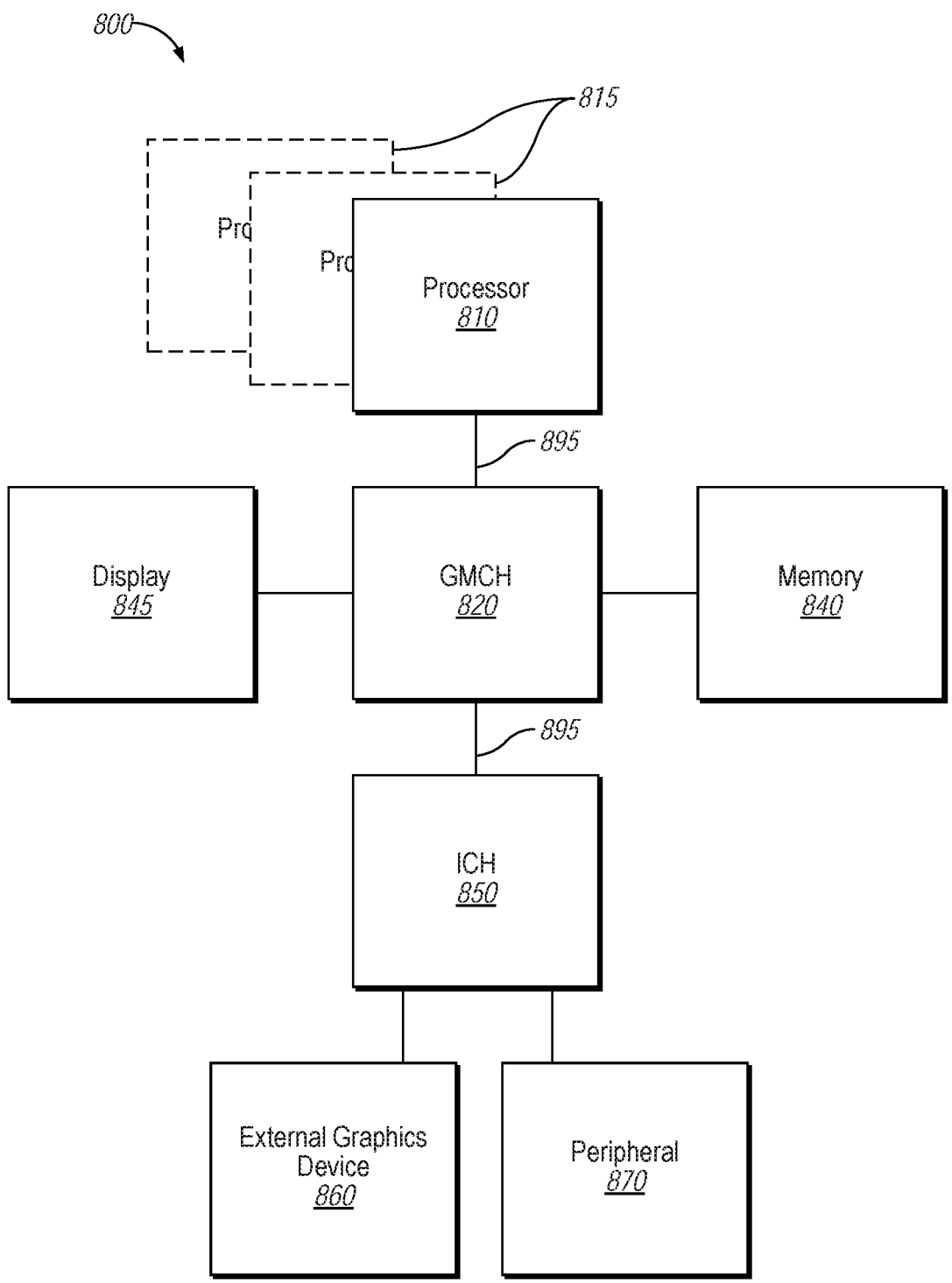
FIG. 8 is a block diagram of a system in which an embodiment of the disclosure may operate.

Referring now to FIG. 8, shown is a block diagram of a system 800 in which one embodiment of the disclosure may operate. The system 800 may include one or more processors 810, 815, which are coupled to graphics memory controller hub (GMCH) 820. The optional nature of additional processors 815 is denoted in FIG. 8 with broken lines. In one embodiment, processors 810, 815 implement hybrid cores according to embodiments of the disclosure.

Each processor 810, 815 may be some version of the circuit, integrated circuit, processor, and/or silicon integrated circuit as described above. However, it should be noted that it is unlikely that integrated graphics logic and integrated memory control units would exist in the processors 810, 815. FIG. 8 illustrates that the GMCH 820 may be coupled to a memory 840 that may be, for example, a dynamic random access memory (DRAM). The DRAM may, for at least one embodiment, be associated with a non-volatile cache.

The GMCH 820 may be a chipset, or a portion of a chipset. The GMCH 820 may communicate with the processor(s) 810, 815 and control interaction between the processor(s) 810, 815 and memory 840. The GMCH 820 may also act as an accelerated bus interface between the processor(s) 810, 815 and other elements of the system 800. For at least one embodiment, the GMCH 820 communicates with the processor(s) 810, 815 via a multi-drop bus, such as a frontside bus (FSB) 895.

Furthermore, GMCH 820 is coupled to a display 845 (such as a flat panel or touchscreen display). GMCH 820 may include an integrated graphics accelerator. GMCH 820 is further coupled to an input/output (I/O) controller hub (ICH) 850, which may be used to couple various peripheral devices to system 800. Shown for example in the embodiment of FIG. 8 is an external graphics device 860, which may be a discrete graphics device, coupled to ICH 850, along with another peripheral device 870.

Alternatively, additional or different processors may also be present in the system 800. For example, additional processor(s) 815 may include additional processors(s) that are the same as processor 810, additional processor(s) that are heterogeneous or asymmetric to processor 810, accelerators (such as, e.g., graphics accelerators or digital signal processing (DSP) units), field programmable gate arrays, or any other processor. There can be a variety of differences between the processor(s) 810, 815 in terms of a spectrum of metrics of merit including architectural, micro-architectural, thermal, power consumption characteristics, and the like. These differences may effectively manifest themselves as asymmetry and heterogeneity amongst the processors 810, 815. For at least one embodiment, the various processors 810, 815 may reside in the same die package.

Figure 9:
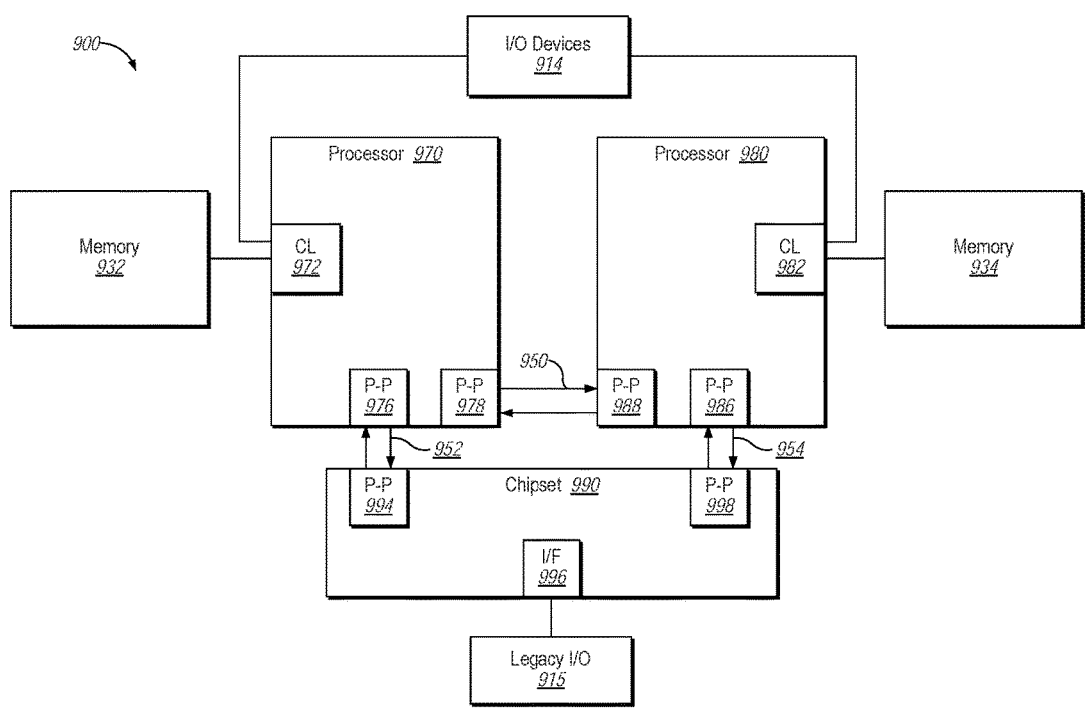
FIG. 9 is a block diagram of a system in which an embodiment of the disclosure may operate.

Referring now to FIG. 9, shown is a block diagram of a system 900 in which an embodiment of the disclosure may operate. FIG. 9 illustrates processors 970, 980. In one embodiment, processors 970, 980 may implement hybrid cores as described above. Processors 970, 980 may include integrated memory and I/O control logic ("CL") 972 and 982, respectively and intercommunicate with each other via point-to-point interconnect 950 between point-to-point (P-P) interfaces 978 and 988 respectively. Processors 970, 980 each communicate with chipset 990 via point-to-point interconnects 952 and 954 through the respective P-P interfaces 976 to 994 and 986 to 998 as shown. For at least one embodiment, the CL 972, 982 may include integrated memory controller units. CLs 972, 982 may include I/O control logic. As depicted, memories 932, 934 coupled to CLs 972, 982 and I/O devices 914 are also coupled to the control logic 972, 982. Legacy I/O devices 915 are coupled to the chipset 990 via interface 996.

Figure 10:
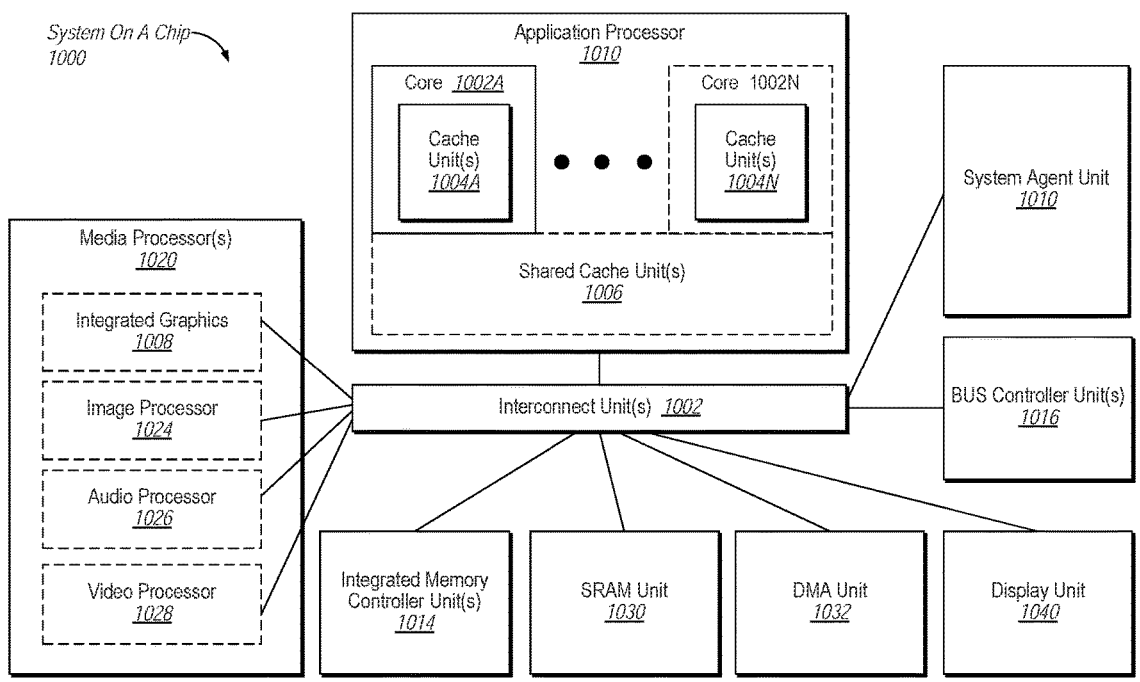
FIG. 10 is a block diagram of a System-on-a-Chip (SoC) in accordance with an embodiment of the present disclosure

Embodiments may be implemented in many different system types. FIG. 10 is a block diagram of a SoC 1000 in accordance with an embodiment of the present disclosure. Dashed lined boxes are optional features on more advanced SoCs. In FIG. 10, an interconnect unit(s) 1012 is coupled to: an application processor 1020 which includes a set of one or more cores 1002A-N and shared cache unit(s) 1006; a system agent unit 1010; a bus controller unit(s) 1016; an integrated memory controller unit(s) 1014; a set or one or more media processors 1018 which may include integrated graphics logic 1008, an image processor 1024 for providing still and/or video camera functionality, an audio processor 1026 for providing hardware audio acceleration, and a video processor 1028 for providing video encode/decode acceleration; an static random access memory (SRAM) unit 1030; a direct memory access (DMA) unit 1032; and a display unit 1040 for coupling to one or more external displays. In one embodiment, a memory module may be included in the integrated memory controller unit(s) 1014. In another embodiment, the memory module may be included in one or more other components of the SoC 1000 that may be used to access and/or control a memory. The application processor 1020 may include a store address predictor for implementing hybrid cores as described in embodiments herein.

The memory hierarchy includes one or more levels of cache within the cores, a set or one or more shared cache units 1006, and external memory (not shown) coupled to the set of integrated memory controller units 1014. The set of shared cache units 1006 may include one or more mid-level caches, such as level 2 (L2), level 3 (L3), level 4 (L4), or other levels of cache, a last level cache (LLC), and/or combinations thereof.

In some embodiments, one or more of the cores 1002A-N are capable of multi-threading. The system agent 1010 includes those components coordinating and operating cores 1002A-N. The system agent unit 1010 may include for example a power control unit (PCU) and a display unit. The PCU may be or include logic and components needed for regulating the power state of the cores 1002A-N and the integrated graphics logic 1008. The display unit is for driving one or more externally connected displays.

The cores 1002A-N may be homogenous or heterogeneous in terms of architecture and/or instruction set. For example, some of the cores 1002A-N may be in order while others are out-of-order. As another example, two or more of the cores 1002A-N may be capable of execution the same instruction set, while others may be capable of executing only a subset of that instruction set or a different instruction set.

The application processor 1020 may be a general-purpose processor, such as a Core™ i3, i5, i7, 2 Duo and Quad, Xeon™, Itanium™, Atom™ or Quark™ processor, which are available from Intel™ Corporation, of Santa Clara, Calif. Alternatively, the application processor 1020 may be from another company, such as ARM Holdings™, Ltd, MIPS™, etc. The application processor 1020 may be a special-purpose processor, such as, for example, a network or communication processor, compression engine, graphics processor, co-processor, embedded processor, or the like. The application processor 1020 may be implemented on one or more chips. The application processor 1020 may be a part of and/or may be implemented on one or more substrates using any of a number of process technologies, such as, for example, BiCMOS, CMOS, or NMOS.

Figure 11:
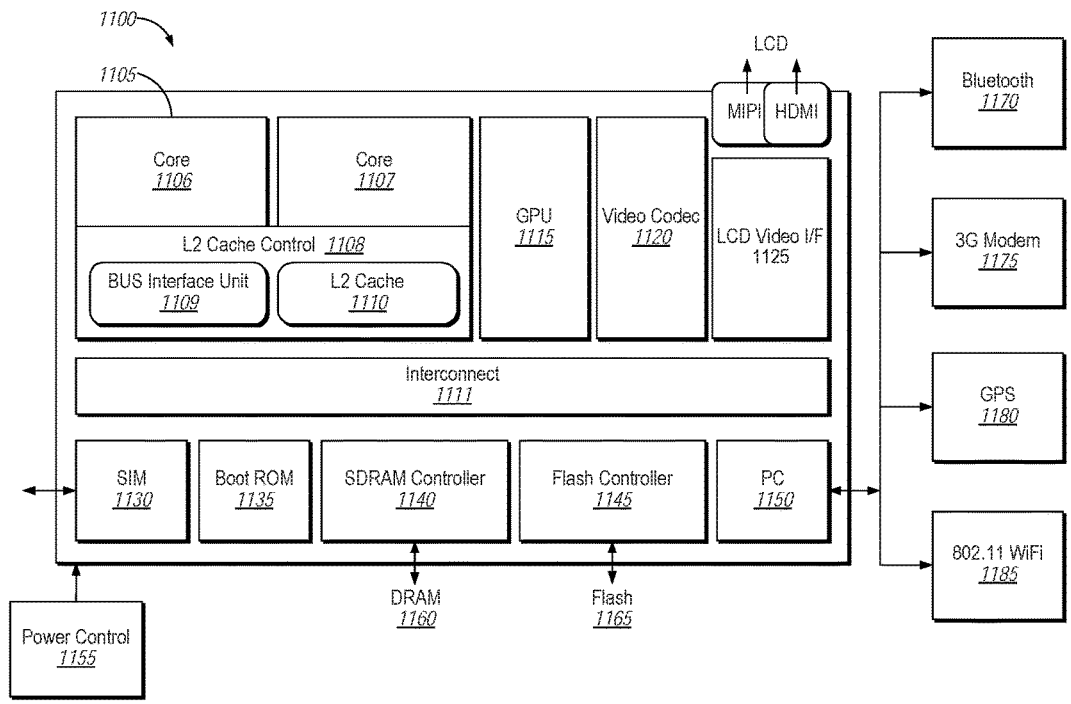
FIG. 11 is a block diagram of an embodiment of an SoC design in accordance with the present disclosure.

FIG. 11 is a block diagram of an embodiment of a system on-chip (SoC) design in accordance with the present disclosure. As a specific illustrative example, SoC 1100 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1100 includes 2 cores—1106 and 1107. Cores 1106 and 1107 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1106 and 1107 are coupled to cache control 1108 that is associated with bus interface unit 1109 and L2 cache 1110 to communicate with other parts of system 1100. Interconnect 1110 includes an on-chip interconnect, such as an IOSF, AMBA, or other interconnect discussed above, which potentially implements one or more aspects of the described disclosure. In one embodiment, cores 1106, 1107 may implement hybrid cores as described in embodiments herein.

Interconnect 1110 provides communication channels to the other components, such as a Subscriber Identity Module (SIM) 1130 to interface with a SIM card, a boot ROM 1135 to hold boot code for execution by cores 1106 and 1107 to initialize and boot SoC 1100, a SDRAM controller 1140 to interface with external memory (e.g. DRAM 1160), a flash controller 1145 to interface with non-volatile memory (e.g. Flash 1165), a peripheral control 1150 (e.g. Serial Peripheral Interface) to interface with peripherals, video codecs 1120 and Video interface 1125 to display and receive input (e.g. touch enabled input), GPU 1115 to perform graphics related computations, etc. Any of these interfaces may incorporate aspects of the disclosure described herein. In addition, the system 1100 illustrates peripherals for communication, such as a Bluetooth module 1170, 3G modem 1175, GPS 1180, and Wi-Fi 1185.

Figure 12:
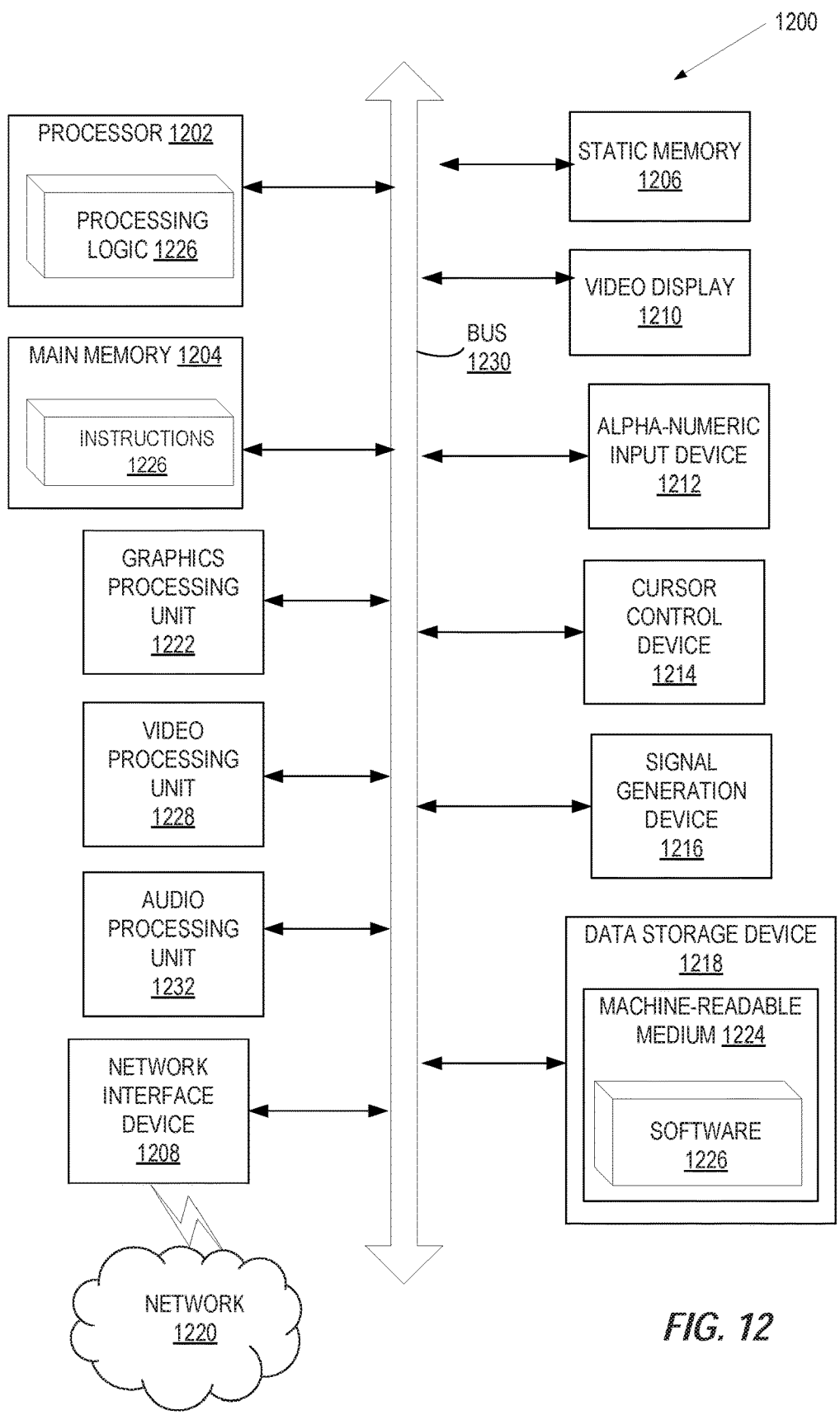
FIG. 12 illustrates a block diagram of one embodiment of a computer system.

FIG. 12 illustrates a diagrammatic representation of a machine in the example form of a computer system 1200 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1200 includes a processing device 1202, a main memory 1204 (e.g., read-only memory (ROM), flash memory, dynamic random access memory (DRAM) (such as synchronous DRAM (SDRAM) or DRAM (RDRAM), etc.), a static memory 1206 (e.g., flash memory, static random access memory (SRAM), etc.), and a data storage device 1218, which communicate with each other via a bus 1230.

Processing device 1202 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. In one embodiment, processing device 1202 may include one or processing cores. The processing device 1202 is configured to execute the processing logic 1226 for performing the operations and steps discussed herein. In one embodiment, processing device 1202 is the same as processor architecture 100 described with respect to FIG. 1 as described herein with embodiments of the disclosure.

The computer system 1200 may further include a network interface device 1208 communicably coupled to a network 1220. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), and a signal generation device 1216 (e.g., a speaker). Furthermore, computer system 1200 may include a graphics processing unit 1222, a video processing unit 1228, and an audio processing unit 1232.

The data storage device 1218 may include a machine-accessible storage medium 1224 on which is stored software 1226 implementing any one or more of the methodologies of functions described herein, such as implementing store address prediction for memory disambiguation as described above. The software 1226 may also reside, completely or at least partially, within the main memory 1204 as instructions 1226 and/or within the processing device 1202 as processing logic 1226 during execution thereof by the computer system 1200; the main memory 1204 and the processing device 1202 also constituting machine-accessible storage media.

The machine-readable storage medium 1224 may also be used to store instructions 1226 implementing store address prediction for hybrid cores such as described according to embodiments of the disclosure. While the machine-accessible storage medium 1128 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present disclosure. The term "machine-accessible storage medium" shall accordingly be taken to include, but not be limited to, solid-state memories, and optical and magnetic media.

The following examples pertain to further embodiments. Example 1 is a processor including a processing core and a memory management unit, communicatively coupled to the processing core, comprising a storage device to store a page table entry (PTE) comprising a mapping from a virtual memory page referenced by an application running on the processing core to an identifier of a memory frame of a memory, a first plurality of access permission flags associated with accessing the memory frame under a first privilege mode, and a second plurality of access permission flags associated with accessing the memory under a second privilege mode, wherein the memory management unit is to allow accessing the memory frame based on one of the first plurality of access permission flags or the second plurality of access permission flags.

In Example 2, the subject matter of Example 1 can optionally provide that the first privilege mode is a supervisor mode, and wherein the first plurality of access permission flags comprises at least one of a read access flag, a write access flag, or an execute-disable access flag associated with accessing the memory frame under the supervisor mode.

In Example 3, the subject matter of any of Examples 1 and 2 can optionally provide that the PTE further comprises a first page validity status flag associated with accessing the memory frame under the supervisor mode.

In Example 4, the subject matter of Example 1 can optionally provide that the second privilege mode is a user mode, and wherein the second plurality of access permission flags comprises at least one of a read access flag, a write access flag, or an execute-disable access flag associated with accessing the memory frame under the user mode.

In Example 5, the subject matter of any of Examples 1 and 4 can optionally provide that the PTE further comprises a second page validity status flag associated with accessing the memory frame under the user mode.

In Example 6, the subject matter of Example 1 can optionally provide that to allow accessing the memory, the memory management unit is to identify a plurality of memory frames associated with a request for accessing the memory, accumulate a final access permission by consecutively applying a logic operation to a plurality of access permission flag values that each is referenced by a respect one of the plurality of memory frames, wherein the plurality of access permission flag values are one of the first plurality of access permission flag values and the second plurality of access permission flag values, and allow accessing the memory based on the final access permission.

In Example 7, the subject matter of any of Examples 1 and 6 can further comprise a logic operator circuit to perform the logic operation, wherein the logic operation comprises one of an AND operator or an OR operator.

In Example 8, the subject matter of Example 7 can optionally provide that the logic operator circuit is to apply the AND operator to a write access permission, and wherein the logic operator circuit is to apply the OR operator an execute-disable access permission.

In Example 9, the subject matter of Example 8 can further comprise a control register, communicatively coupled to the processing core, wherein the control register is to store a configuration flag that, when set, enables a decoupling of access permission flags between the first privilege mode and the second privilege mode in the PTE.

Example 10 is a system-on-a-chip including a memory to store a page table entry (PTE) and a processor, communicatively coupled to the memory, comprising a memory management unit, communicatively coupled to the processing core, comprising a storage device to store the PTE loaded from the memory, the PTE comprising a mapping from a virtual memory page referenced by an application running on the processing core to an identifier of a memory frame of a memory, a first plurality of access permission flags associated with accessing the memory frame under a first privilege mode, and a second plurality of access permission flags associated with accessing the memory under a second privilege mode, wherein the memory management unit is to allow accessing the memory frame based on one of the first plurality of access permission flags or the second plurality of access permission flags.

In Example 11, the subject matter of Example 10 can optionally provide that the first privilege mode is a supervisor mode, and wherein the first plurality of access permission flags comprises at least one of a read access flag, a write access flag, or an execute-disable access flag associated with accessing the memory frame under the supervisor mode.

In Example 12, the subject matter of Examples 10 and 11 can optionally provide that the PTE further comprises a first page validity status flag associated with accessing the memory frame under the supervisor mode.

In Example 13, the subject matter of Example 10 can optionally provide that the second privilege mode is a user mode, and wherein the second plurality of access permission flags comprises at least one of a read access flag, a write access flag, or an execute-disable access flag associated with accessing the memory frame under the user mode.

In Example 14, the subject matter of Examples 10 and 13 can optionally provide that the PTE further comprises a second page validity status flag associated with accessing the memory frame under the user mode.

In Example 15, the subject matter of Example 10 can optionally provide that to allow accessing the memory, the memory management unit is to identify a plurality of memory frames associated with a request for accessing the memory, accumulate a final access permission by consecutively applying a logic operation to a plurality of access permission flag values that each is referenced by a respect one of the plurality of memory frames, wherein the plurality of access permission flag values are one of the first plurality of access permission flag values and the second plurality of access permission flag values, and allow accessing the memory based on the final access permission.

In Example 16, the subject matter of Examples 10 and 15 can further comprise a logic operator circuit to perform the logic operation, wherein the logic operation comprises one of an AND operator or an OR operator.

In Example 17, the subject matter of Example 16 can optionally provide that the logic operator circuit is to apply the AND operator to a write access permission, and wherein the logic operator circuit is to apply the OR operator an execute-disable access permission.

In Example 18, the subject matter of Example 10 can optionally provide that the processor further comprises a control register, communicatively coupled to the processing core, wherein the control register is to store a configuration flag that, when set, enables a decoupling of access permission flags between the first privilege mode and the second privilege mode in the PTE.

Example 19 is a method comprising receiving, by a processor executing an application, a request to access a memory frame of a memory, determining whether the application generating the request is associated with a first privilege mode or a second privilege mode, responsive to determining that the application is associated with the first privilege mode, allowing accessing the memory frame based on a first plurality of access permission flags associated with the first privilege mode, and responsive to determining that the application is associated with the second privilege mode, allowing accessing the memory frame based on a second plurality of access permission flags associated with the second privilege mode, wherein the first plurality of access permission flags and the second plurality of access permission flags are stored in a page table entry in the memory.

In Example 20, the subject matter of Example 1 can optionally provide that the first privilege mode is a supervisor mode and the second privilege mode is a user mode, wherein the first plurality of access permission flags comprises at least one of a read access flag, a write access flag, or an execute-disable access flag associated with accessing the memory under the supervisor mode, and wherein the second plurality of access permission flags comprises at least one of a read access flag, a write access flag, or an execute-disable access flag associated with accessing the memory frame under the user mode.

Example 21 is an apparatus comprising: means for performing the method of any of Examples 19 and 20.

Example 22 is a machine-readable non-transitory medium having stored thereon program code that, when executed by a processor, perform operations comprising receiving, by a processor executing an application, a request to access a memory frame of a memory, determining whether the application generating the request is associated with a first privilege mode or a second privilege mode, responsive to determining that the application is associated with the first privilege mode, allowing accessing the memory frame based on a first plurality of access permission flags associated with the first privilege mode, and responsive to determining that the application is associated with the second privilege mode, allowing accessing the memory frame based on a second plurality of access permission flags associated with the second privilege mode, wherein the first plurality of access permission flags and the second plurality of access permission flags are stored in a page table entry in the memory.

In Example 23, the subject matter of Example 22 can optionally provide that the first privilege mode is a supervisor mode and the second privilege mode is a user mode, wherein the first plurality of access permission flags comprises at least one of a read access flag, a write access flag, or an execute-disable access flag associated with accessing the memory under the supervisor mode, and wherein the second plurality of access permission flags comprises at least one of a read access flag, a write access flag, or an execute-disable access flag associated with accessing the memory frame under the user mode.

While the disclosure has been described with respect to a limited number of embodiments, those skilled in the art will appreciate numerous modifications and variations there from. It is intended that the appended claims cover all such modifications and variations as fall within the true spirit and scope of this disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 910 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A processing system comprising:
   a processing core; and
   a memory management unit, communicatively coupled to the processing core, comprising:
   a storage device to store a page table entry (PTE) comprising:
   a mapping from a virtual memory page referenced by an application running on the processing core to an identifier of a memory frame of a memory,
   a first plurality of access permission flags associated with accessing the memory frame under a first privilege mode, and
   a second plurality of access permission flags associated with accessing the memory under a second privilege mode,
   wherein the memory management unit is to allow:
   accessing the memory frame under the first privilege mode based on the first plurality of access permission flags when a privilege configuration flag is set to enabled;
   accessing the memory frame under the second privilege mode based on the second plurality of access permission flags when the privilege configuration flag is enabled; and
   accessing the memory frame under the first privilege mode or the second privilege mode based on commonly shared access permission flags from the first plurality of access permission flags and the second plurality of access permission flags when the privilege configuration flag is disabled.

2. The processing system of claim 1, wherein the first privilege mode is a supervisor mode, and wherein the first plurality of access permission flags comprises at least one of a read access flag, a write access flag, or an execute-disable access flag associated with accessing the memory frame under the supervisor mode.

3. The processing system of claim 2, wherein the PTE further comprises a first page validity status flag associated with accessing the memory frame under the supervisor mode.

4. The processing system of claim 1, wherein the second privilege mode is a user mode, and wherein the second plurality of access permission flags comprises at least one of a read access flag, a write access flag, or an execute-disable access flag associated with accessing the memory frame under the user mode.

5. The processing system of claim 4, wherein the PTE further comprises a second page validity status flag associated with accessing the memory frame under the user mode.

6. The processing system of claim 1, wherein to allow accessing the memory, the memory management unit is to:
   identify a plurality of memory frames associated with a request for accessing the memory;
   accumulate a final access permission by consecutively applying a logic operation to a plurality of access permission flag values that each is referenced by a respective one of the plurality of memory frames, wherein the plurality of access permission flag values are one of a first plurality of access permission flag values and a second plurality of access permission flag values; and allow accessing the memory based on the final access permission.

7. The processing system of claim 6, further comprises a logic operator circuit to perform the logic operation, wherein the logic operation comprises one of an AND operator or an OR operator.

8. The processing system of claim 7, wherein the logic operator circuit is to apply the AND operator to a write access permission, and wherein the logic operator circuit is to apply the OR operator to an execute-disable access permission.

9. The processing system of claim 1, further comprising:
a control register, communicatively coupled to the processing core, wherein the control register is to store the privilege configuration flag that, when set, enables a decoupling of access permission flags between the first privilege mode and the second privilege mode in the PTE.

10. A system-on-a-chip (SoC), comprising:
a memory to store a page table entry (PTE); and
a processor, communicatively coupled to the memory, comprising:
a processing core; and
a memory management unit, communicatively coupled to the processing core, comprising:
a storage device to store the PTE loaded from the memory, the PTE comprising a mapping from a virtual memory page referenced by an application running on the processing core to an identifier of a memory frame of a memory, a first plurality of access permission flags associated with accessing the memory frame under a first privilege mode, and a second plurality of access permission flags associated with accessing the memory under a second privilege mode,
wherein the memory management unit is to allow:
accessing the memory frame under the first privilege mode based on the first plurality of access permission flags when a privilege configuration flag is set to enabled;
accessing the memory frame under the second privilege mode based on the second plurality of access permission flags when the privilege configuration flag is enabled; and
accessing the memory frame under the first privilege mode or the second privilege mode based on commonly shared access permission flags from the first plurality of access permission flags and the second plurality of access permission flags when the privilege configuration flag is disabled.

11. The SoC of claim 10, wherein the first privilege mode is a supervisor mode, and wherein the first plurality of access permission flags comprises at least one of a read access flag, a write access flag, or an execute-disable access flag associated with accessing the memory frame under the supervisor mode.

12. The SoC of claim 11, wherein the PTE further comprises a first page validity status flag associated with accessing the memory frame under the supervisor mode.

13. The SoC of claim 10, wherein the second privilege mode is a user mode, and wherein the second plurality of access permission flags comprises at least one of a read access flag, a write access flag, or an execute-disable access flag associated with accessing the memory frame under the user mode.

14. The SoC of claim 13, wherein the PTE further comprises a second page validity status flag associated with accessing the memory frame under the user mode.

15. The SoC of claim 10, wherein to allow accessing the memory, the memory management unit is to:
identify a plurality of memory frames associated with a request for accessing the memory;
accumulate a final access permission by consecutively applying a logic operation to a plurality of access permission flag values that each is referenced by a respective one of the plurality of memory frames, wherein the plurality of access permission flag values are one of a first plurality of access permission flag values and a second plurality of access permission flag values; and
allow accessing the memory based on the final access permission.

16. The SoC of claim 15, further comprises a logic operator circuit to perform the logic operation, wherein the logic operation comprises one of an AND operator or an OR operator.

17. The SoC of claim 16, wherein the logic operator circuit is to apply the AND operator to a write access permission, and wherein the logic operator circuit is to apply the OR operator to an execute-disable access permission.

18. The SoC of claim 10, wherein the processor further comprises:
a control register, communicatively coupled to the processing core, wherein the control register is to store the privilege configuration flag that, when set, enables a decoupling of access permission flags between the first privilege mode and the second privilege mode in the PTE.

19. A method comprising:
receiving, by a processor executing an application, a request to access a memory frame of a memory;
determining whether a privilege configuration flag is set to enable access to the memory frame based on a first privilege mode or a second privilege mode;
determining whether the application generating the request is associated with the first privilege mode or the second privilege mode;
allowing accessing the memory frame under the first privilege mode based on a first plurality of access permission flags when the a privilege the configuration privilege flag is set to enabled;
allowing accessing the memory frame under the second privilege mode based on a second plurality of access permission flags when the privilege configuration flag is set, wherein the first plurality of access permission flags and the second plurality of access permission flags are stored in a page table entry in the memory; and
allowing accessing the memory frame under the first privilege mode or the second privilege mode based on commonly shared access permission flags from the first plurality of access permission flags and the second plurality of access permission flags when the configuration flag is disabled.

20. The method of claim 19, wherein the first privilege mode is a supervisor mode and the second privilege mode is a user mode, wherein the first plurality of access permission flags comprises at least one of a read access flag, a write access flag, or an execute-disable access flag associated with accessing the memory under the supervisor mode, and wherein the second plurality of access permission flags comprises at least one of a read access flag, a write access flag, or an execute-disable access flag associated with accessing the memory frame under the user mode.

\* \* \* \* \*